United States Patent [19]

Brown et al.

[11] Patent Number: 5,693,891

[45] Date of Patent: Dec. 2, 1997

[54] FLOWMETER FOR MEASURING THE FLOW RATE OF A TWO PHASE FLUID IN A PIPE

[76] Inventors: Andrew Brown, Kirkhill Place Kirkhill Indust. Estate, Dyce Aberdeen, AB2 0ES Scotland; Joseph Allen, Silverburn Plane, Bridge of Don Aberdeen, AB23 8EG, both of Scotland

[21] Appl. No.: 481,342

[22] PCT Filed: Jan. 7, 1994

[86] PCT No.: PCT/GB94/00051

§ 371 Date: Oct. 10, 1995

§ 102(e) Date: Oct. 10, 1995

[87] PCT Pub. No.: WO94/16295

PCT Pub. Date: Jul. 21, 1994

[30] Foreign Application Priority Data

Jan. 9, 1993 [GB] United Kingdom ............... 9300360

[51] Int. Cl.$^6$ ........................................... G01F 1/44
[52] U.S. Cl. ........................... 73/861.04; 73/861.63
[58] Field of Search ....................... 73/861.04, 861.52, 73/861.63, 861.64

[56] References Cited

U.S. PATENT DOCUMENTS

| 790,888 | 5/1905 | Ferris | 73/861.64 |
| 2,984,105 | 5/1961 | Nagel et al. | 73/861.04 |
| 4,231,262 | 11/1980 | Boll et al. | 73/861.04 |
| 4,856,344 | 8/1989 | Hunt | 73/861.63 |

FOREIGN PATENT DOCUMENTS 2261519  5/1993  United Kingdom.

OTHER PUBLICATIONS

The Venturi Meter by Builders Iron Foundry, Bulletin 75, p. 4, Fig. 1.

*Primary Examiner*—Richard Chilcot
*Assistant Examiner*—Harshad Patel
*Attorney, Agent, or Firm*—Madson & Metcalf, P.C.

[57] ABSTRACT

A flowmeter for measuring the flow rate of a two phase liquid in a pipe having a first pipe section (11) having a first diameter (D1), a second pipe section (12) of a smaller diameter (D2), an internally tapering transition pipe section (13) forming a smooth transition between the first and second pipe sections (11, 12), and three pressure tapping points comprising upstream ($At_u$, $Bt_u$, $Ct_u$), downstream ($At_d$, $Bt_d$, $Ct_d$) and intermediate tapping points ($At_i$, $Bt_i$, $Ct_i$), in which a first differential pressure monitoring arrangement is provided to measure the pressure differential between the upstream and the downstream tapping points and form which fluid density can be derived, and a second differential pressure monitoring arrangement is provided to monitor the pressure differential between the intermediate tapping point and one of the upstream or downstream tapping points, whereby flow rates can be calculated from the derived density value and the second differential pressure measurement.

20 Claims, 1 Drawing Sheet

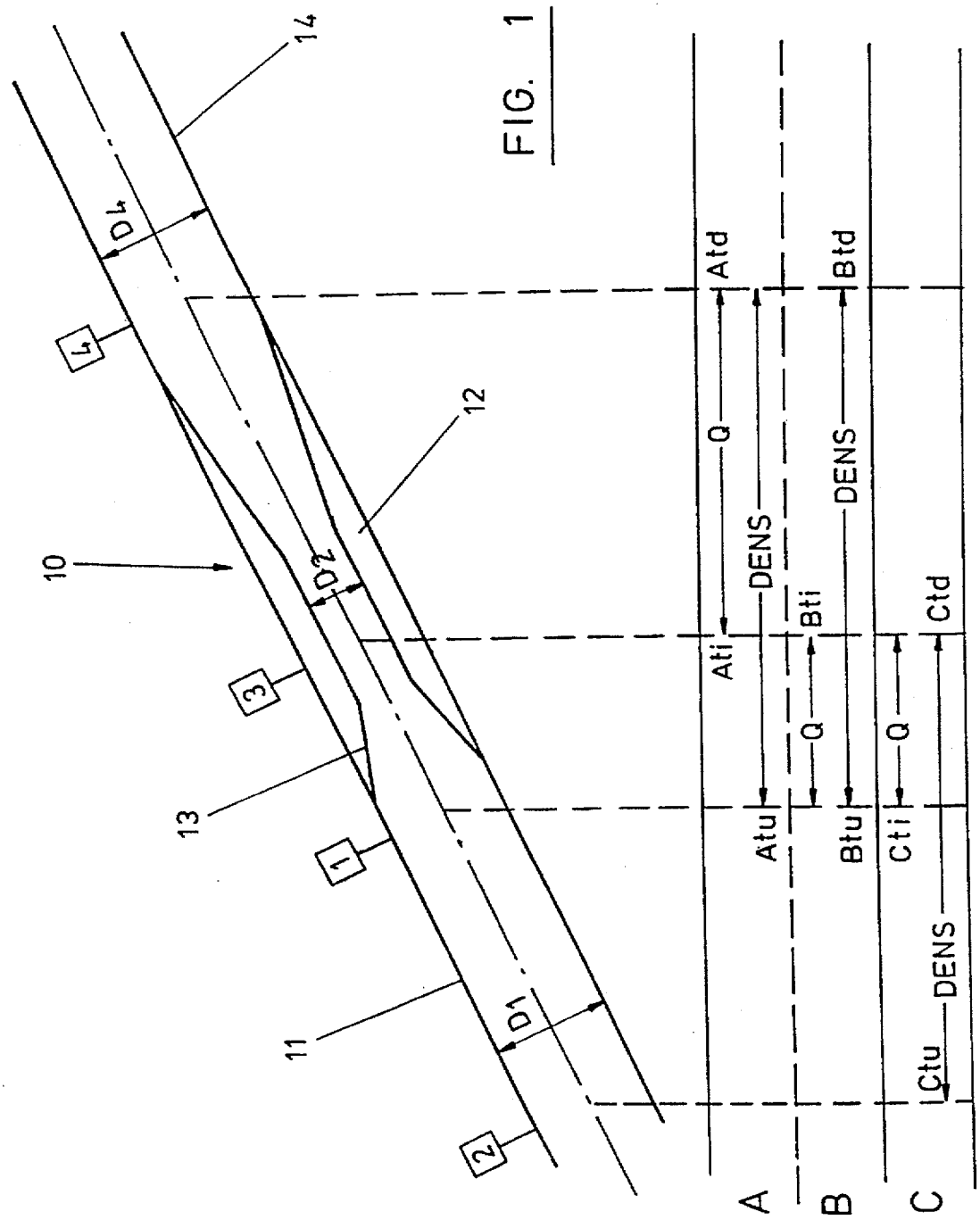

FLOWMETER FOR MEASURING THE FLOW RATE OF A TWO PHASE FLUID IN A PIPE

This invention relates to a flowmeter for use in measuring the flow rate of a two phase fluid in a pipe, such as an oil production pipe.

The invention has been developed primarily in connection with the measurement of the flow rate of fluids extracted from underground reservoirs of hydrocarbons, which can comprise liquid/liquid mixtures and gaseous/liquid mixtures, such as water/oil mixtures and natural gas/hydrocarbon mixtures.

It is known e.g. from GB2186981 (Schlumberger Limited) to provide a flowmeter for measuring the flow rate of a two phase fluid and which comprises a gradiomanometer and a venturi meter in series and which are formed by a first section of pipe with a first diameter, a second section of pipe with a second diameter less than the first diameter, a third intermediate section of pipe connecting the first and second pipe sections and having a diameter changing smoothly and gradually from the first diameter to the second diameter, and an arrangement of pressure sensors placed at selected positions in the pipe sections to monitor pressure differentials and from which the flow rate of the two phase fluid can be derived.

The arrangement of pressure sensors comprises a first pressure sensor positioned in the neighbourhood of the start of the change of diameter of the third section of pipe from the first diameter to the second diameter, a second pressure sensor in the first section of pipe spaced upstream from the first pressure sensor, and a third pressure sensor spaced in the pipe downstream from the first pressure sensor. Means is provided to make a first differential pressure measurement between the first and second pressure sensors which is indicative of the density of the fluid flowing through the pipe, and means is also provided for making a second differential pressure measurement between the first and third pressure sensors, and from this there can be derived the flow rate of the fluid flowing through the pipe from the density value obtained from the first differential pressure measurement and also from the second differential pressure measurement which is obtained.

The Schlumberger reference also describes in detail the calculations involved in determining the flow rate of the two phase fluid.

The present invention is concerned with an improved arrangement of pressure sensors in a pipe through which a two phase fluid is flowing and is to be monitored, and improved means of deriving pressure differential measurements from which the flow rate of the fluid can be derived.

According to the invention there is provided a flowmeter for measuring the flow rate of a two phase fluid in a pipe and which comprises a first pipe section having a first diameter, a second pipe section of a smaller diameter, an internally tapering third pipe section forming a smooth transition between the first and second pipe sections, and three pressure tapping points comprising upstream, downstream and intermediate tapping points, in which a first differential pressure monitoring arrangement is provided to measure the pressure differential between the upstream and the downstream tapping points and from which fluid density can be derived, and a second differential pressure monitoring arrangement is provided to monitor the pressure differential between the intermediate tapping point and one of the upstream or downstream tapping points, whereby flow rate can be calculated from the derived density value and the second differential pressure measurement.

The invention therefore applies a fundamentally different method of monitoring the pressure differentials between the upstream, downstream and the intermediate tapping points, which has a number of technical advantages over the known flow meter arrangement. In particular, the flow meter will usually be provided in a dedicated tubular section to be incorporated in an oil production well, and the novel arrangement of the first and second differential pressure monitoring arrangements enable the overall length of the dedicated tubular section to be reduced compared to existing arrangements.

In a first embodiment, the upstream tapping point is arranged in the region of the upstream end of the transition pipe section, the intermediate tapping is arranged at any convenient position along the length of the second pipe section, and the downstream tapping is arranged at a convenient position along the length of a fourth pipe section arranged downstream of the second pipe section. The density calculation is derived from the pressure differential monitored between the upstream and downstream pressure tapping points, whereas the second differential pressure measurement is made between the intermediate pressure tapping point and the downstream pressure tapping point.

In a second embodiment, the upstream and downstream pressure tapping points are arranged in generally similar position to the first embodiment, but the second differential pressure measurement is made between the intermediate pressure tapping point and the upstream pressure tapping point.

In a third embodiment, the upstream pressure tapping point is arranged in the first pipe section at a position spaced upstream of the transition pipe section, whereas the downstream pressure tapping point is arranged within the second pipe section, and the pressure differential measured between the upstream and downstream tapping points serves to enable the density to be derived. The intermediate pressure tapping point is arranged in the region of the upstream end of the transition pipe section, and the second differential pressure measurement is made between the intermediate pressure tapping point and the downstream pressure tapping point.

The diameter of the second pipe section is smaller than the diameter of the first pipe section, and is arranged downstream thereof, and the fourth pipe section, i.e. further downstream pipe section may have the same diameter as the first pipe section, or may be different therefrom.

The embodiments of the invention enable individual flow rates of a two phase fluid to be measured e.g. the individual flow rates of oil and water in an oil production well.

Fluid density is calculated by measuring the pressure difference between two tapping points which are vertically spaced from each other, though this vertical spacing need not be one directly above the other, as the flow meter of the invention may be employed both in a vertical or an inclined well. Gross flow rate is derived from a venturi device, and individual oil and water flow rates can be easily calculated since oil and water densities will be known.

In the invention, the first differential pressure measurement (from which density is derived) is made between the two extreme pressure tapping points of the three pressure tappings i.e. the upstream and downstream tappings, and the advantage of this is that it maximises the distance between the two measuring points which improves the accuracy of the density measurement. A further benefit is the reduced overall length of the device.

The measurement of the first and the second differential pressures may be carried out using absolute pressure gauges at each pressure tapping point, or by use of differential gauges to measure the pressure differences between the appropriate pressure tapping points.

Three embodiments of flowmeter according to the invention will now be described in detail, by way of example only, with reference to the accompanying schematic drawing.

Referring now to the drawing, this shows a dedicated tubular flow monitoring tool which can be incorporated in an oil production well, and which is designated generally by reference 10. The tool 10 comprises a first pipe section 11 having a first diameter D1, a second pipe section 12 of smaller diameter D2, and an internally tapering third pipe section 13 which forms a smooth transition between first pipe section 11 and smaller diameter second pipe section 12.

Three embodiments of the invention are shown schematically in the lower part of the drawing, designated by references A, B and C. In each embodiment, there are three pressure tapping points comprising upstream, downstream and intermediate tapping points, and a first differential pressure monitoring arrangement is provided to measure the pressure differential between the upstream and the downstream tapping points, and from which fluid density is derived, and a second differential pressure monitoring arrangement is provided to monitor the pressure differential between the intermediate tapping point and one of the upstream or downstream tapping points. Fluid flow rate can then be calculated from the density value and from the second differential pressure measurement.

In the first embodiment, shown by reference A, the upstream pressure tapping point is designated by reference $At_u$, the downstream tapping point by reference $At_d$ and the intermediate tapping point by reference $At_i$. It will be seen that the upstream pressure tapping point $At_u$ is arranged in the region of the upstream end of the tapering third pipe section 13, whereas the downstream pressure tapping $At_d$ is arranged in a downstream fourth pipe section 14, which preferably, though not essentially, has an internal diameter D4 which is approximately the same as diameter D1 of first pipe section 11. The density calculation is derived from the differential pressure measured between the upstream and the downstream pressure tapping point $At_u$ and $At_d$, whereas the second differential pressure measurement is made between the intermediate pressure tapping point $At_i$ and the downstream pressure tapping point $At_d$.

In the embodiment shown by reference B, the upstream, downstream and intermediate pressure tapping points are located at the same positions as for the embodiment A, and are designated by references $Bt_u$, $Bt_d$ and $Bt_i$ respectively. However, while the first pressure differential measurement from which the density is derived is made between the upstream and downstream pressure tapping points $Bt_u$ and $Bt_d$, in this embodiment the second differential pressure measurement is made between the intermediate pressure tapping point $Bt_i$ and the upstream pressure tapping point $Bt_u$.

Finally, in the embodiment shown by reference C, the upstream, downstream and intermediate pressure tapping points are designated by references $Ct_u$, $Ct_d$ and $Ct_i$. The first differential pressure measurement is made between the upstream and the downstream pressure tapping points $Ct_u$ and $Ct_d$, from which density is derived, but the second differential pressure measurement is made between the intermediate pressure tapping point $Ct_i$ and the downstream pressure tapping point $Ct_d$. However, in this embodiment, the upstream pressure tapping point $Ct_u$ is arranged in the first pipe section 1, well upstream of the third transition pipe section 13, the downstream pressure tapping point $Ct_d$ is arranged within the second pipe section 12, whereas the intermediate pressure tapping point $Ct_i$ is arranged in the region of the upstream end of the third transition pipe section 13.

The differential pressure measurements may be made either using absolute pressure gauges at each pressure tapping point (shown schematically by references 1, 2, 3 and 4), or by using differential pressure gauges to measure the pressure differences between the appropriate pressure tapping points.

We claim:

1. A flowmeter for measuring a flow rate of a two phase fluid in a pipe and which comprises a first pipe section having a first diameter, a second pipe section of a smaller diameter, an internally tapering transition pipe section forming a smooth transition between the first and second pipe sections, and three pressure tapping points comprising upstream, downstream and intermediate tapping points, wherein the upstream and downstream tapping points are vertically spaced, in which a first differential pressure monitoring arrangement is provided to measure the pressure differential between the upstream and the downstream tapping points and from which fluid density is derived, and a second differential pressure monitoring arrangement is provided to monitor the pressure differential between the intermediate tapping point and one of the upstream and downstream tapping points, whereby flow rates of both phases of the two phase fluid is calculated from the derived density value and the second differential pressure measurement.

2. A flowmeter according to claim 1, wherein the flowmeter is provided in a dedicated tubular section to be incorporated in an oil production well.

3. A flowmeter according to claim 2, in which the upstream tapping point is arranged at a region of the upstream end of the transition pipe section, the intermediate tapping is arranged along the length of the second pipe section, and the downstream tapping is arranged along the length of a fourth pipe section arranged downstream of the second pipe section.

4. A flowmeter according to claim 3, wherein the density calculation can be derived from the pressure differential monitored between the upstream and downstream pressure tapping points, and wherein the second differential pressure measurement is made between the intermediate pressure tapping point and the downstream pressure tapping point.

5. A flowmeter according to claim 3, wherein the density calculation can be derived for the pressure differential monitored between the upstream and downstream pressure tapping points, and wherein the second differential pressure measurement is made between the intermediate pressure tapping point and the upstream pressure tapping point.

6. A flowmeter according to claim 2, in which the upstream tapping point is arranged in the first pipe section at a position spaced upstream of the transition pipe section, the downstream pressure tapping point is arranged within the second pipe section and the intermediate pressure tapping point is arranged in the region of the upstream end of the transition pipe section.

7. A flowmeter according to claim 6, wherein the pressure differential can be measured between the upstream and downstream tapping points to enable the density to be derived, and the second differential pressure measurement is made between the intermediate pressure tapping point and the downstream pressure tapping point.

8. A flowmeter according to claim 1, in which the upstream tapping point is arranged at a region of the upstream end of the transition pipe section, the intermediate tapping is arranged along the length of the second pipe section, and the downstream tapping is arranged along the length of a fourth pipe section arranged downstream of the second pipe section.

9. A flowmeter according to claim 8, wherein the density calculation can be derived from the pressure differential monitored between the upstream and downstream pressure tapping points, and wherein the second differential pressure measurement is made between the intermediate pressure tapping point and the downstream pressure tapping point.

10. A flowmeter according to claim 8, wherein the density calculation can be derived from the pressure differential monitored between the upstream and downstream pressure tapping points, and wherein the second differential pressure measurement is made between the intermediate pressure tapping point and the upstream pressure tapping point.

11. A flowmeter according to claim 8, in which fluid density is calculated by measuring the pressure difference between two tapping points which are vertically spaced from each other.

12. A flowmeter according to claim 1, in which the upstream tapping point is arranged in the first pipe section at a position spaced upstream of the transition pipe section, the downstream pressure tapping point is arranged within the second pipe section and the intermediate pressure tapping point is arranged in the region of the upstream end of the transition pipe section.

13. A flowmeter according to claim 12, wherein the pressure differential can be measured between the upstream and downstream tapping points to enable the density to be derived, and the second differential pressure measurement is made between the intermediate pressure tapping point and the downstream pressure tapping point.

14. A flowmeter according to claim 13, in which fluid density is calculated by measuring the pressure difference between two tapping points which are vertically spaced from each other.

15. A flowmeter according to claim 14, wherein the flowmeter is oriented vertically for use in a vertical well, in which the two tapping points from which fluid density is derived are arranged directly one above the other.

16. A flowmeter according to claim 14, wherein the flowmeter is inclined for use in an inclined well, in which the two tapping points from which fluid density is derived are vertically spaced from each other, but not directly one above the other.

17. A flowmeter according to claim 12, in which fluid density is calculated by measuring the pressure difference between two tapping points which are vertically spaced from each other.

18. A flowmeter according to claim 1, in which fluid density is calculated by measuring the pressure difference between two tapping points which are vertically spaced from each other.

19. A flowmeter according to claim 18, wherein the flowmeter is oriented vertically for use in a vertical well, in which the two tapping points from which fluid density is derived are arranged directly one above the other.

20. A flowmeter according to claim 18, wherein the flowmeter is inclined for use in an inclined well, in which the two tapping points from which fluid density is derived are vertically spaced from each other, but not directly one above the other.

* * * * *